United States Patent

Thapa et al.

[11] Patent Number: 5,826,189
[45] Date of Patent: Oct. 20, 1998

[54] CELLULAR COMMUNICATION SYSTEM WITH EFFICIENT CHANNEL ASSIGNMENTS AND METHOD THEREFOR

[75] Inventors: Mukund Narain-dhami Thapa, Palo Alto, Calif.; Kenneth Maynard Peterson; Yih Guang Jan, both of Phoenix, Ariz.; Amir David Foroudi, Tempe, Ariz.

[73] Assignee: Motorola, Inc., Schaumburg, Ill.

[21] Appl. No.: 715,113

[22] Filed: Sep. 17, 1996

Related U.S. Application Data

[63] Continuation of Ser. No. 258,877, Jun. 13, 1994, abandoned.

[51] Int. Cl.$^6$ .................................................. H04B 7/185
[52] U.S. Cl. .............................. 455/428; 455/452; 455/62
[58] Field of Search .................................. 455/12.1, 13.1, 455/33.1, 33.4, 34.1, 53.1, 54.1, 56.1, 62, 63, 67.1, 422, 427, 428, 429, 430, 450, 452, 453; 379/59

[56] References Cited

U.S. PATENT DOCUMENTS

| | | | |
|---|---|---|---|
| 3,764,915 | 10/1973 | Cox et al. | 455/33.1 |
| 3,879,581 | 4/1975 | Schlosser et al. | 179/15 |
| 4,670,899 | 6/1987 | Brody et al. | 379/60 |
| 5,038,399 | 8/1991 | Bruckert | 455/33 |
| 5,212,831 | 5/1993 | Chuang et al. | 455/54.1 |
| 5,268,694 | 12/1993 | Jan et al. | 455/63 |
| 5,367,304 | 11/1994 | Jan et al. | 455/13.1 |
| 5,434,512 | 8/1994 | Wang et al. | 455/12.1 |
| 5,448,750 | 9/1995 | Eriksson et al. | 455/33.1 |

OTHER PUBLICATIONS

An article entitled "Channel Assignment For Cellular Radio Using Simulated Annealing", by Manuel Duque–Anton, Dietmar Kunz and Bernhard Ruber from IEEE Transactions On Vehicular Technology, vol. 42, No. 1, Feb. 1993.

An article entitled "Channel Assignment in Cellular Radio" by Kumar N. Sivarajan and Robert J. McEliece, California Institute of Technology, and John W. Ketchum, GTE Laboratories Incorporated from IEEE 1989.

(List continued on next page.)

*Primary Examiner*—Thanh Cong Le
*Attorney, Agent, or Firm*—Bradley J. Botsch, Sr.

[57] ABSTRACT

A cellular communication system (10) forms cells (18) from low earth orbit satellites (12). The system (10) uses an off-line process (24) to identify cells (18) that fall within various reuse distances of other cells (18) and to save system usage statistics. An on-line process (42) associates a demand with each cell (18), and the demand is predicted from the system usage statistics. Need factors assigned in response to the cells' demands are ranked and processed by an inner loop that assigns the various ones of the cells (18) to one channel (22) at a time and an outer loop that performs the inner loop for many different channels (22). The inner loop assigns cells (18) to a selected channel (22) in accordance with the need factor ranking.

25 Claims, 5 Drawing Sheets

OTHER PUBLICATIONS

An article entitled "A Graph Theoretical Analysis of Dynamic Channel Assignment Algorithms for Mobile Radiocommunications System" by M. Grevel and A. Sachs from Siemens Forsch–u Entwickl–Ber.Bd 12 (1983) Nr. 5 Springer–Verlag 1983.

An article entitled "The Frequency Assignment Problem: A Solution via Nonlinear Programming*" by J. David Allen, Richard V. Helgason and Jeffrey L. Kennington from Naval Research Logistics, vol. 34 pp. 133–139(1987) Copyright 1987 by John Wiley & Sons, Inc.

An article entitled Frequency Assignment: Theory and Applications by William K. Hales from Manuscript received May 6, 1980; revised Jul. 25, 1980. The author is with ITS/NTIA, U.S. Department of Commerce, Boulder CO 80302.

An article entitled "Virtually Fixed Channel Assignment For Cellular Radio–Telephone Systems: A Model and Evaluation" by Zuoying Xu and Pitu B. Mirchandani from 1992 IEEE.

An article entitled "A Heuristic Techique For Assigning Frequencies To Mobile Radio Nets" by Frank Box from 1978 IEEE.

An article entitled "Dynamic Channel Assignment In Cellular Radio" by Kumar N. Sivarajan and Robert J. McEliece and John Ketchum from 1990 IEEE.

| 46 ↓ | | | | |
|---|---|---|---|---|
| ASSIGNMENT MATRIX | | | | |
| | CHANNEL | | | |
| CELL | 1 | 2 | ••• | N |
| 1 | | | | |
| 2 | | | | |
| ⋮ | | | | |
| M | | | | |

*FIG. 5*

| 50 ↓ | | | | |
|---|---|---|---|---|
| AVAILABILITY MATRIX | | | | |
| | CHANNEL | | | |
| CELL | 1 | 2 | ••• | N |
| 1 | | | | |
| 2 | | | | |
| ⋮ | | | | |
| M | | | | |

*FIG. 6*

| 54 ↓ | |
|---|---|
| DEMAND VECTOR | |
| CELL | DEMAND |
| 1 | |
| 2 | |
| ⋮ | ⋮ |
| M | |

*FIG. 7*

| 60 ↓ | | |
|---|---|---|
| NEED VECTOR | | |
| RANK | CELL ID | NEED |
| 1 | | |
| 2 | | |
| ⋮ | ⋮ | ⋮ |
| M | | |

*FIG. 8*

FIG. 9 ately to communication
systems. More specifically, the present invention relates to
systems that divide an area within which communications
are to take place into cells and which reuse spectrum among
certain ones of the cells.

CELLULAR COMMUNICATION SYSTEM WITH EFFICIENT CHANNEL ASSIGNMENTS AND METHOD THEREFOR

This application is a continuation of prior application Ser. No. 08/258,877 filed, Jun. 13, 1994, abandoned.

TECHNICAL FIELD OF THE INVENTION

The present invention relates generally to communication systems. More specifically, the present invention relates to systems that divide an area within which communications are to take place into cells and which reuse spectrum among certain ones of the cells.

BACKGROUND OF THE INVENTION

Conventional cellular communication systems adopt a frequency reuse plan. Generally speaking, cell antennas generate antenna patterns that cover spaced apart locations. Each antenna's pattern, along with transmitter power, receiver sensitivity, and geographical features, define a cell. A cell is a geographical area on or near the surface of the earth within which communications may take place through a subscriber unit and the cell's antenna.

The spectrum allocated to a conventional cellular system is divided into a few, fixed discrete clusters of channels. Each cell is allocated only one of the clusters, and each cell is preferably surrounded by cells that use other clusters. Communications within a cell use only the cluster of channels allocated to the cell, and interference between communications taking place in other nearby cells is minimized because communications in such nearby cells use different clusters. Co-channel cells are cells that reuse the same cluster. To minimize interference, the frequency reuse plan spaces co-channel cells a predetermined distance apart.

Conventional cellular systems inefficiently allocate cells to channels. The conventional fixed reuse pattern does a poor job of matching system resources with needs for the resources. For example, in some highly populated cells, an insufficient number of channels may be available to handle demand. In other cells channels may go unused.

Accordingly, a need exists for a cellular system that utilizes its spectrum by allocating channels to cells in response to the demand for channels at the cells. However, several problems arise in attempting to meet this need. For example, the demand in different cells may change over time, and a new allocation of channels to cells may be needed in response to the change. When the communication system includes many cells, the computations may consume an excessive amount of time even if performed by high speed computers. This computation time problem is severely exacerbated when the cells move, as occurs when the cells' antennas are carried by satellites placed in low earth orbits, i.e. in a satellite cellular communications system. The demand for channels is associated with the different geographical areas across which cells move. Thus, the demand in each cell changes rapidly as the cells move relative to geographical areas. New channel-to-cell allocation definitions for the entire system may be needed every few seconds to track the movement.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
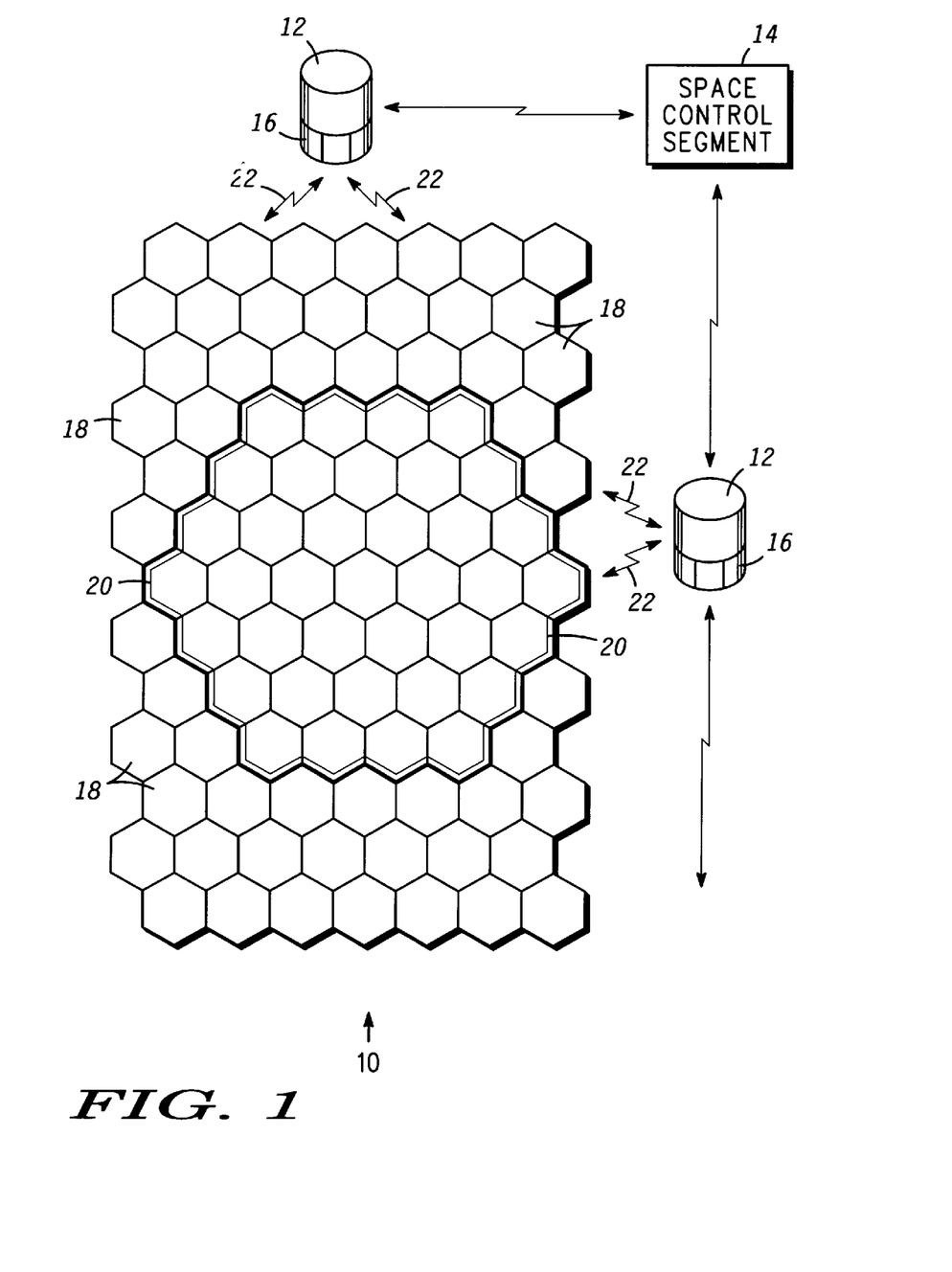
FIG. 1 shows a schematic representation of an environment within which a preferred embodiment of the present invention is practiced.

FIG. 1 shows a schematic representation of an environment within which a cellular communication system 10 may be implemented. In the preferred embodiment, system 10 includes satellites 12 which orbit the earth, an earth-based space control segment 14, and other items (not shown) which are not relevant to the present invention. Satellites 12 are in data communication with each other and with space control segment 14.

As presently preferred, sixty-six of satellites 12 are arranged in a constellation of six, low earth, polar orbits. Each orbital plane contains eleven of satellites 12. FIG. 1 shows only two of these satellites 12 for convenience. Due to the low earth orbits, satellites 12 move at speeds of around 25,000 km/hr with respect to the earth. The polar orbits cause satellites 12 to converge longitudinally as they approach the poles and diverge longitudinally as they approach the equator.

Each satellite 12 has an antenna array 16 which projects numerous antenna patterns toward the earth in diverse directions. Each pattern encompasses a solid angle and covers an area of the earth called a cell 18. The set of cells 18 formed by a single satellite 12 represents a satellite footprint 20. Due to the movement of satellites 12, cells 18 and footprints 20 likewise move relative to the earth.

FIG. 1 illustrates cells 18 as being regular hexagonal shapes. Footprint 20 is illustrated as the area in FIG. 1 within the double line and is shown containing thirty-seven of cells 18. These schematic representations are made for the purpose of clarity. The presently preferred embodiment of the present invention actually envisions forty-eight cells 18 in each footprint 20, making a total of 3168 cells 18 available to cover the entire surface of the earth, but other cellular systems may use different numbers. Those skilled in the art will appreciate that in practice the equal field strength lines represented by cell boundaries may have more elliptical, circular, or other shapes and that different cells 18 in a footprint 20 may have different shapes and sizes.

As the orbital planes for satellites 12 converge approaching the poles and diverge approaching the equator, the corresponding satellite footprints 20 overlap and diverge. A significant amount of footprint overlap exists in the polar regions while little overlap exists at the equator. To compensate for the overlap, system 10 may deactivate certain cells 18 so that no significant overlap occurs between active cells 18. The determination of which cells 18 to activate and deactivate may be made in response to geometric calculations based upon orbital characteristics of satellites 12 and patterns for antennas 16. In order to track the activation and inactivation of cells 18, system 10 may operate within windows or frames of time in which the active and inactive character of cells 18 does not change, but as old frames of time end and new frames of time begin the character of cells 18 may change. In the presently preferred embodiment of the present invention, these frames of time are around 5.76 seconds so that a twenty-four hour period includes 15,000 frames.

System 10 offers communication services which take place between locations near the surface of the earth and satellites 12. Such communications are carried by communication channels 22. In the preferred embodiment, each cell 18 can accommodate a number of different channels 22 so that a number of different communications may occur simultaneously. The preferred embodiment uses time division multiple access (TDMA) coupled with frequency division multiple access (FDMA) to divide the spectrum used by system 10 into discrete channels 22. System 10 thus has several hundred channels 22 to allocate to cells 18 to meet the need for communication services over the area covered by system 10.

FIGS. 2–9 together illustrate a system and processes for constructing a channel-to-cell definition. This definition is preferably constructed at a central location for system 10, such as at space control segment 14 (see FIG. 1). The channel-to-cell definition may be constructed using a conventional computer system operated in accordance with the below-described processes. Such a computer system can be thought of as comprising a communications demand analyzer, a constraint determiner, and a channel assignor, either as an integral unit or coupled via signal transmission. Once the definition is constructed, it is desirably distributed to satellites 12 so that each satellite 12 knows which channels 22 are available for use in which of its cells 18. System 10 then conducts communications in accordance with this definition. In the presently preferred embodiment, system wide channel-to-cell definitions for 22,500 frames, or 36 hours, are constructed and distributed every twenty-four hours under normal circumstances. However, when natural disasters or other emergencies or factors cause unexpected demand for services in certain locations, or when equipment failures occur, channel-to-cell definitions for a different number of frames may still be constructed and distributed quickly.

Figure 2:
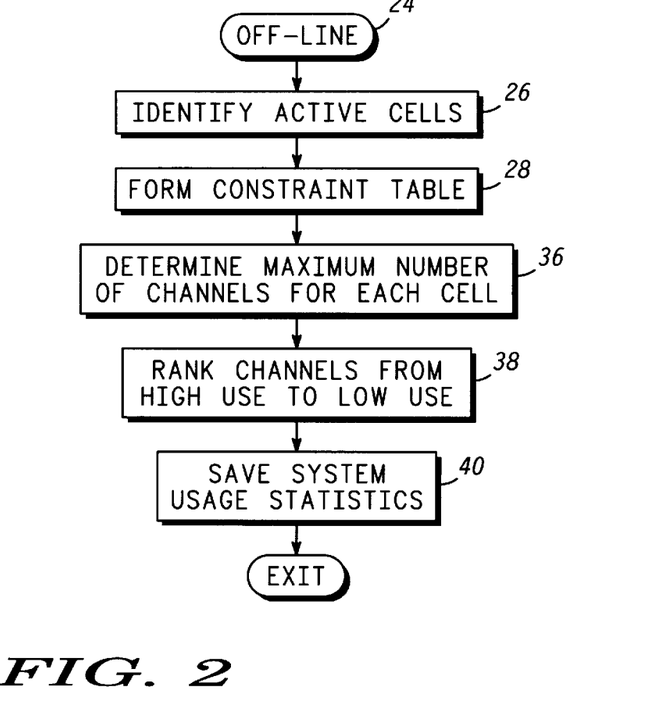
FIG. 2 shows a flow chart of an off-line process performed to support the allocation of communication channels to cells.
Figure 4:
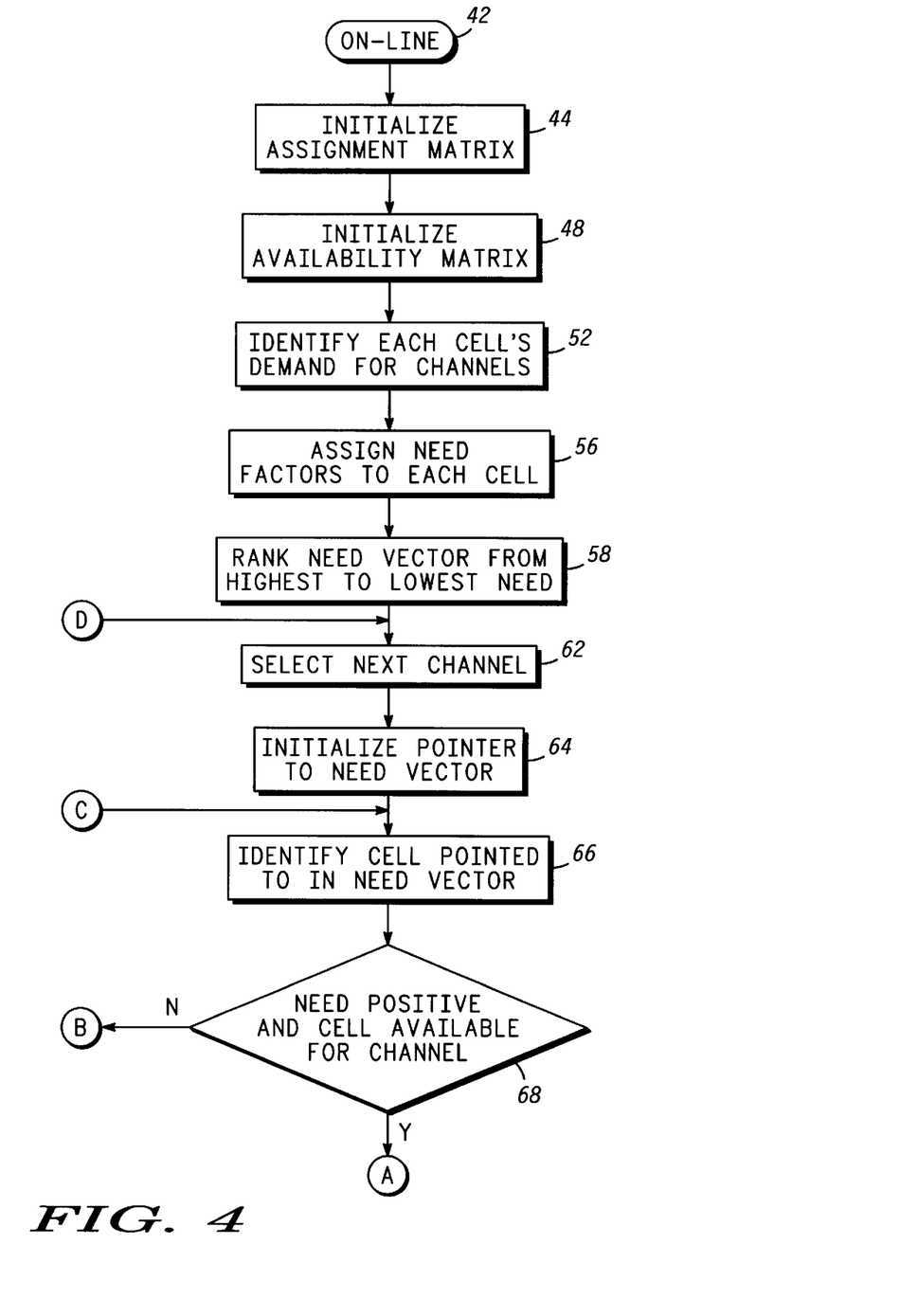
FIG. 4 shows a flow chart of a first portion of an on-line process performed to support the allocation of communication channels to cells.

FIG. 2 shows a flow chart of an off-line process 24 performed to support the allocation of communication channels 22 to cells 18. Off-line process 24 may be performed for a frame at any time before an on-line process, discussed below in connection with FIG. 4, is performed for the same frame. Desirably, off-line process 24 is performed before the on-line process to prevent significant delay in constructing a channel-to-cell definition for the frame. In fact, off-line process 24 may be performed for a future frame on one processor or computer while another processor or computer performs the on-line process for a current frame to take advantage of parallel processing efficiencies.

Off-line process 24 performs a task 26 to identify cells 18 which are to be considered active for the duration of the frame. As discussed above, certain cells 18 may be deactivated to compensate for the convergence of orbits as satellites 12 approach the poles or for other reasons. Cells 18 are deactivated so that no significant overlap exists between active cells 18. Generally, task 26 may be performed by evaluating the distances between the centers of each cell 18 during the subject frame. When the distance between two cells 18 is less than a predetermined distance, an overlap is declared between the two cells 18. In the presently preferred embodiment, an overlap is declared when at least 70% of two cells 18 occupy the same area. Task 26 then determines which of the two overlapping cells 18 to define as inactive to cure the overlap. Any cell which is not declared as inactive is defined to be active. For the following discussion, "M" represents the number of active cells. In the presently preferred embodiment, this number M is around $\frac{2}{3}$ of the total cells 18 available to system 10 during any frame.

Figure 3:
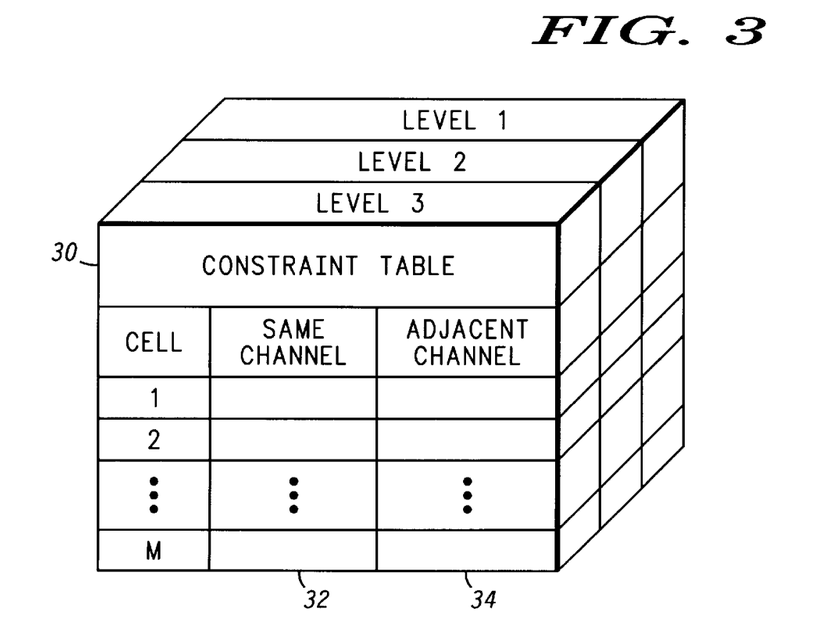
FIG. 3 shows a schematic block diagram of a constraint table memory structure.

Next, a task 28 forms a constraint table 30, an exemplary schematic block diagram of which is shown in FIG. 3. Task 28 forms constraint table 30 in response to the list of M active cells 18 obtained from task 26. Constraint table 30 is a memory structure that defines reuse distances which will control how close to one another certain channels 22 may be assigned without risking significant interference. However, rather than provide a single distance variable, task 28 determines and table 30 identifies which active cells 18 fall within certain reuse distances of each of the M active cells 18. The specification of specific cell identities rather than a reuse distance speeds performance of the on-line process.

As depicted in FIG. 3, different types of reuse distances may be relevant to each cell 18. For example, a channel 22 being assigned to a cell 18 may not be reused within a same channel reuse distance 32 of the cell 18 to which it is assigned. In addition, other channels 22 that are adjacent to a channel 22 being assigned to a cell 18 may not be reused within a different adjacent channel reuse distance 34 of the assigned cell 18. Adjacent channels 22 are immediately above or below a selected channel 22 in frequency at the same time slot, immediately before or after a selected channel 22 in time at the same frequency, or possibly immediately above or immediately below a selected channel 22 at immediately before or immediately after time slots. The adjacent channel reuse distance prevents a significant risk of interference from channel slide. Channel slide in frequency results from Doppler between moving satellites 12 and nearly stationary subscriber units (not shown) on the earth. Channel slide in time results from the propagation duration of signals between satellites 12 and the subscriber units. Of course, those skilled in the art will appreciate that table 30 need not separate a same channel list from an adjacent channel list as depicted in FIG. 3, but may combine the two types of constraints into a single list of constrained cells associated with types of channels.

In addition, constraint table 30 may set forth reuse distances, expressed by identifying cells 18 which reside within the reuse distances, for different levels of constraints. A higher level of constraint may be based upon large reuse distances and provide a smaller risk of interference. A lower level of constraint may be based upon smaller reuse distances and provide greater risk of interference. In addition, lower levels of constraint may utilize more relaxed definitions for adjacent channels. For example, a lower level of constraint may apply only to channels 22 that are adjacent to a selected channel 22 in frequency or time but not both, while a higher level of constraint may apply to channels adjacent in both frequency and time.

Referring to FIG. 2, after task 28 forms table 30, a task 36 determines a maximum number of channels 22 which are available for assignment in each active cell 18. The numbers of channels 22 available for assignment in various cells 18 may vary for any of several reasons. For example, during a subject frame, one cell 18 may cover a geographic area where the spectrum is limited, perhaps due to governmental restraints, compared to spectrum available in other geographic areas. Hardware limitations in satellites 12 may force different cells 18 to accommodate different numbers of channels 22. In addition, hardware failures may limit the number of channels 22 otherwise available in some cells. Of course, nothing prevents all active cells 18 from having the same maximum number of channels 22 available for assignment therein. Task 36 takes no steps to make an assignment, and the maximum number of channels 22 available as determined in task 36 need not bear a relation to the demand for channels 22 during a subject frame.

After task 36, a task 38 ranks the available channels 22, if necessary, by performing a sorting operation or the like. Desirably, channels 22 are ranked from high use channels 22 to low use channels 22. High use channels are typically assigned to more cells 18 by the on-line process. Thus, channels 22 are ranked to specify which channels 22 are to be used more often. In the preferred embodiment, higher frequency channels 22 are ranked above lower frequency channels 22 for this purpose. Consequently, system 10 tends to get greater use from higher frequency channels 22 throughout its area of coverage than from lower frequency channels. This ordering is performed to reduce the chances of interference with uses of the spectrum which are lower in frequency than the spectrum used by system 10. However, other systems may rank channels 22 in different orders to reduce the likelihood of interference with specific frequency bands outside the spectrum used by such systems.

After task 38 a task 40 takes steps to save and/or organize system usage statistics. Usage statistics represent a log of the calls carried by system 10. Log entries desirably reflect the time of day when calls are made and one or more geographic areas of the earth involved in the call. In addition, log entries desirably record requests for service which may have been denied due to a lack of capacity. Call records which are conventionally used in telephony contain such information, and system 10 desirably routes such information to space control segment 14 when convenient. After task 40, program control exits off-line process 24.

FIG. 4 shows a flow chart of a first portion of an on-line process 42 performed to support the allocation of communication channels 22 to active cells 18 for a given frame. Desirably, off-line process 24 (see FIG. 2) is performed for the same frame before beginning process 42. As will be discussed in more detail below, process 42 is configured to quickly construct a channel-to-cell definition for system 10 for the subject frame. Process 42 may be repeated as needed to construct corresponding definitions for other frames. The quick execution of process 42 speeds the construction of channel-to-cell definitions for a multiplicity of frames.

Generally, process 42 assigns a plurality of cells 18 to one channel 22 at a time, rather than completing the assignment of all channels to a cell then moving to the next cell. This fundamental structure helps speed the execution of process 42. After a channel 22 and cell 18 are linked through an assignment, constraints are applied to other cells 18 rather than to other channels 22. Moreover, cells 18 are assigned to a channel 22 in a prioritized order which associates channels 22 with cells 18 having a greater need before considering assignments to cells 18 having a smaller need. This process allows many different channels 22 to be assigned to common cells 18, subject to the constraints discussed above in connection with FIG. 3.

Desirably, system 10 accommodates the assignment of channels 22 individually rather than in clusters. Thus, the likelihood of over-assigning channels 22 where they are not needed is reduced, and unneeded channels in one cell 18 do not constrain the use of such channels in nearby cells 18. However, in the presently preferred embodiment and in other systems hardware constraints unrelated to the present invention actually impose restrictions which require a small number, for example eight, of channels 22 to be assigned together as a cluster. When the spectrum for system 10 includes several hundred channels 22, this small number of channels 22 per cluster does not severely limit the ability of system 10 to distribute channels in response to demand. In this situation, a multiplicity of such clusters may still be assigned to cells 18, and the number of combinations of different clusters which may be assigned in different cells is extremely large. For simplicity, the below-presented discussion focuses upon the general case where channels 22 are assigned individually rather in clusters. However, those skilled in the art will appreciate that this discussion also applies to clusters having a small number of individual channels relative to the total number of available channels.

Figure 5:
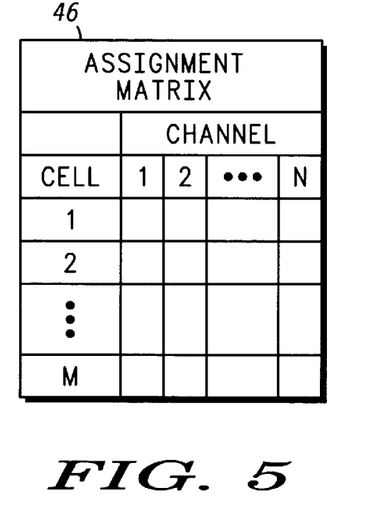
FIG. 5 shows a schematic block diagram of an assignment matrix memory structure.

Process 42 performs a task 44 to initialize an assignment matrix 46, a schematic block diagram of which is depicted in FIG. 5. Matrix 46 represents a memory structure having M times N flags or indicators, where M is the number of active cells 18 and N is the number of channels 22 available for assignment throughout system 10. Matrix 46 desirably arranges cell addresses using an index to the list of active cells 18 determined in task 26 (see FIG. 2) or by cell ID and arranges channel addresses in accordance with the ranking determined in task 38 (see FIG. 2). Task 44 initializes matrix 46 by indicating that no channel 22 is assigned in any cell 18.

Figure 6:
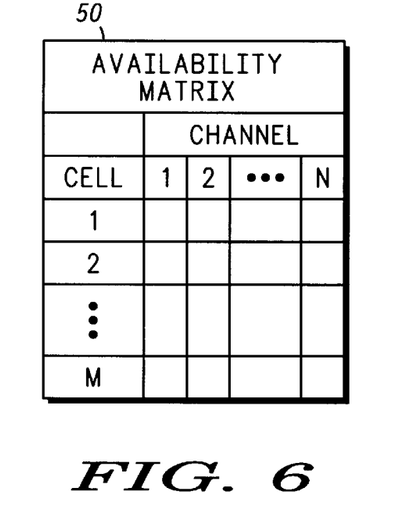
FIG. 6 shows a schematic block diagram of an availability matrix memory structure.

Next, a task 48 initializes an availability matrix 50, a schematic block diagram of which is depicted in FIG. 6. Matrix 50 represents a memory structure having N flags or indicators. Generally, task 48 initializes matrix 50 to indicate that all channels 22 are available for assignment in all cells 18. However, task 48 may assert particular not-available indications as necessary where certain cells 18 may not have the full set of channels 22 available for assignment, as discussed above in connection with task 36 (see FIG. 2).

After task 48, a task 52 obtains each cell's demand for channels 22 from a demand model output (not shown). The demand model desirably evaluates the usage statistics saved and/or organized above in task 40 (see FIG. 2) in determining demand. Generally, demand for the subject frame is predicted from past usage, but can be from a demand model or other source as well. For each active cell 18, the demand model desirably evaluates usage statistics for the geographical area covered by the cell 18 during a selected prior period in time. The selected prior period in time may be the like frame in a prior twenty-four hour period. Alternatively, the selected prior period may, for example, be from a prior week to accommodate cyclical weekly trends or from a prior year to accommodate cyclical annual holiday trends. Moreover, the demand model desirably processes the usage statistics to improve the robustness of the prediction. For example, the demand model may multiply past usage statistics by a scale factor to cause system 10 to allocate in a future frame what would have been excess capacity in all cells for a past frame. In one embodiment, the demand model determines the worst case demand for channels over a twenty-four period in a particular area and allocates to meet that demand for all frames in a subsequent twenty-four period.

Of course, task 52 does not preclude the use of intervention to alter cell demands otherwise determined. For example, special channel-to-cell definitions may be constructed to accommodate unusual situations, such as natural disasters at particular areas of the world. Such situations may increase the normal demand for channels in select areas.

Figure 7:
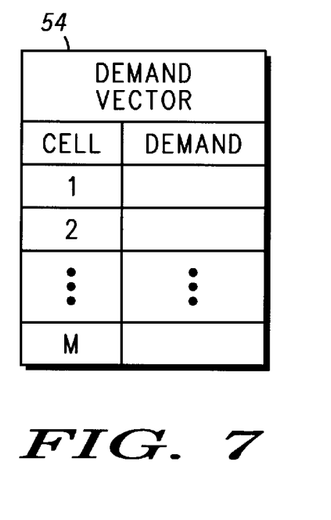
FIG. 7 shows a schematic block diagram of a demand vector memory structure.

Task 52 forms a demand vector 54, an exemplary schematic block diagram of which is shown in FIG. 7. Demand vector 54 is a memory structure which associates a demand factor with each active cell 18. Each demand factor desirably indicates the number of channels 22 which process 42 should attempt to assign in the corresponding cells 18. Note that other variations in the method and apparatus described below are possible, including, for example, a combined demand vector 54 and need vector 60.

Figure 8:
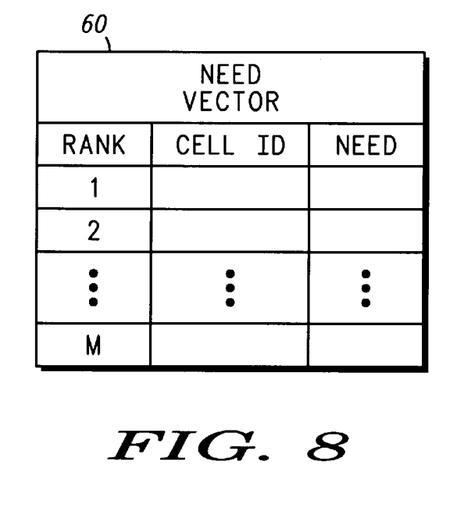
FIG. 8 shows a schematic block diagram of a need vector memory structure.

Next, a task 56 assigns need factors in response to the demand factors obtained in task 52, and a task 58 ranks the active cells 18 from highest need to lowest need. Need factors are configured in proportion to demand. Positive need factors indicate a demand for additional channel assignments. Zero and negative need factors indicate that the demand has been met. The need factors may be organized in a need vector 60, a schematic block diagram of which is shown in FIG. 8. Generally, each need factor describes a cell's demand for channels 22. Thus, in one embodiment of the present invention the demand factors obtained in task 52 directly serve as need factors.

However, in a more sophisticated embodiment, task 56 processes the demand factors in assigning need factors. The inclusion of demand in the need factor allows the algorithm to quickly determine when demand has been met without having to explicitly represent the demand constraints. However, this does not preclude the obvious extension where the need factors do not incorporate demand as a linear term and, instead, a separate vector keeps track of unsatisfied demand. In some situations a cell's need for channels 22 may differ from the cell's demand for channels 22. For example, when a cell 18 has only a small demand for channels 22 but at the same time only a very small number of channels 22 are available for meeting the demand, then that cell's need may be greater than another cell that has greater demand and a greater number of channels available to meet the demand. Thus, task 56 may assign need factors by dividing each demand factor from demand vector 54 (see FIG. 7) by the maximum number of channels 22 available in the corresponding cell 18, as determined above in task 36 (see FIG. 2).

Task 58 sorts the list of need factors according to need. Cells 18 having higher need factors are ranked higher than cells 18 having lower need factors. In case of need factor ties, other parameters may be evaluated in the sort. For example, cells having a smaller number of maximum available channels 22, as determined above in task 36 (see FIG. 2), may by ranked higher. Likewise, cells 18 having a smaller number of associated constrained cells in constraint table 30 (see FIG. 3) may be ranked higher. Desirably, a sorting routine which quickly generates a ranked list of need factors in association with cell IDs is used.

After task 58, on-line process 42 enters a programming loop at a task 62. This programming loop assigns active cells 18 to one channel 22 at a time. In other words, this programming loop includes an inner loop which assigns multiple cells 18 to a single channel 22 and an outer loop which performs the inner loop for multiple channels 22.

Task 62 selects the channel 22 that the inner loop will process, and a subsequent task 64 initializes a pointer which indexes need vector 60 (see FIG. 8). Task 62 selects channels 22 in the order determined above in task 38 (see FIG. 2). In the preferred embodiment, task 62 selects the highest frequency channel 22 for assignment to various cells 18 during the first iteration of the inner loop. Subsequent iterations of task 62 select progressively lower frequency channels 22. Task 64 initializes the pointer to the cell 18 having the highest need. Due to the ranking operation of task 58, the cell 18 having the highest need is the first or top entry in need vector 60 in the preferred embodiment.

After task 64, process 42 enters the inner loop at a task 66. Task 66 evaluates need vector 60 (see FIG. 8) to identify the cell 18 indexed by the pointer. After task 66, a query task 68 determine whether the indexed cell's need is a positive number and whether the indexed cell 18 is available so that the selected channel 22 may be assigned to it.

Task 68 evaluates whether the need is a positive number to prevent over-assigning of channels 22 beyond a cell's demand for channel assignments. This allows otherwise over-assigned channels 22 to be available for assignments in other cells 18 that on-line process 42 will subsequently process. However, in other embodiments over-assignments may not be a concern and this evaluation may be omitted, or uniform over-assigning may be implemented by causing task 68 to test for need factors less than a predetermined negative number.

Figure 9:
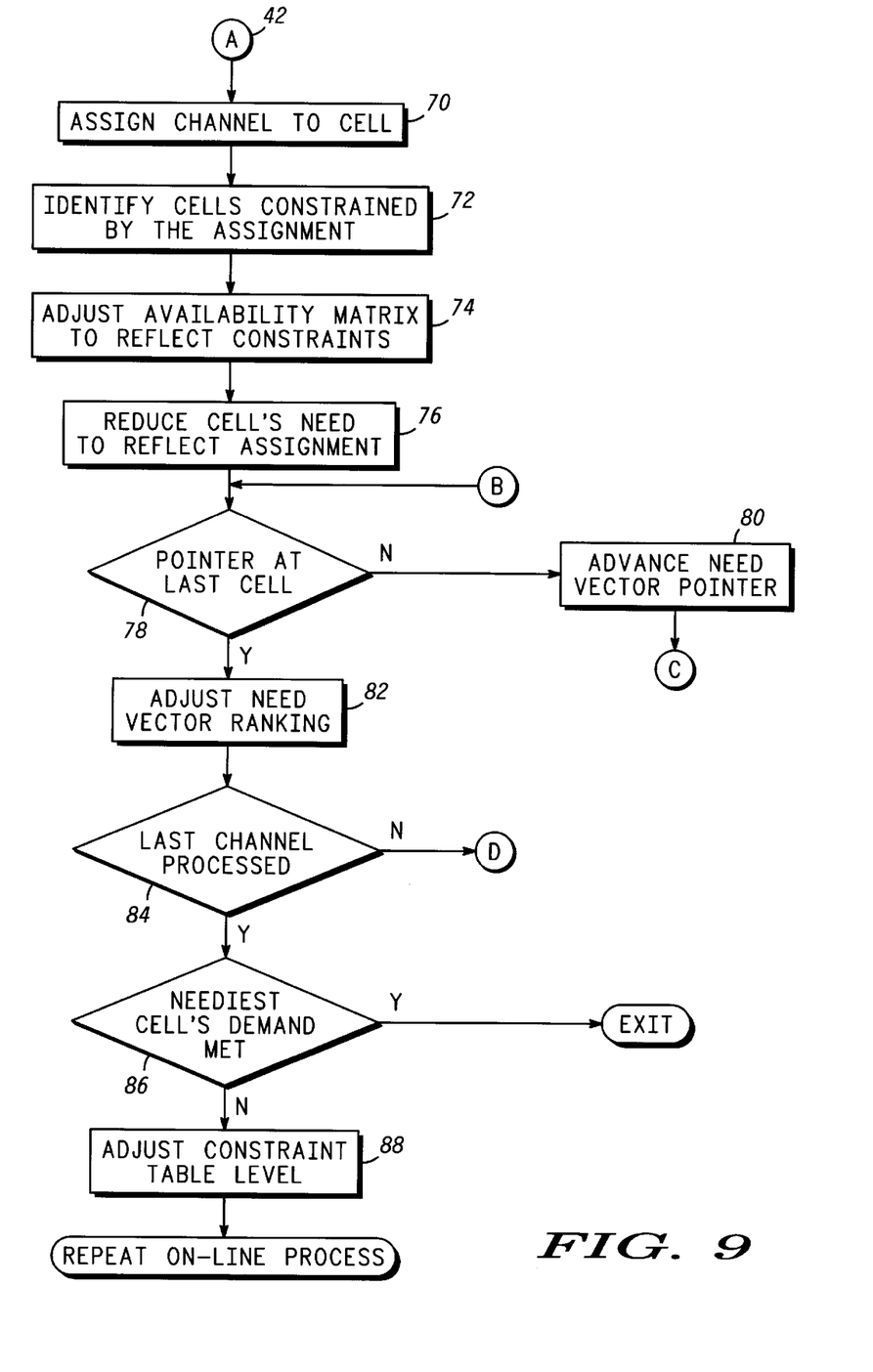
FIG. 9 shows a flow chart of a second portion of the on-line process.

The availability of a cell for an assignment may be determined by evaluating availability matrix 50 (see FIG. 6) at the selected channel 22 and indexed cell 18. If availability is indicated, then the cell 18 is considered available. When task 68 determines that an indexed cell is both available and has a positive need, program control proceeds to a task 70, as indicated through connector "A" shown in FIGS. 4 and 9. FIG. 9 shows a flow chart of a second portion of on-line process 42. Task 70 assigns the selected channel 22 to the indexed cell 18. The assignment is made by setting a flag in assignment matrix 46 (see FIG. 5) associated with the selected channel 22 and indexed cell 18.

After task 70, a task 72 identifies the cells 18 that are constrained by the assignment of task 70 and the channels for which the cells 18 are constrained. Task 72 may identify such cells and channels by using the assigned cell 18 as an index into constraint table 30 (see FIG. 3). Presumably, a first performance of on-line process 42 for a specified frame will evaluate table 30 at a high constraint level to achieve the lowest possible risk of interference. Next, a task 74 adjusts availability matrix 50 (see FIG. 6) to reflect the constraints. In other words, task 74 stores not-available indications in matrix 50 at the cells 18 and same or adjacent channels 22 determined above in task 72.

After task 74, a task 76 reduces the assigned cell's need factor to reflect the assignment. If demand factors are directly used as need factors, then the need may be reduced by one to reflect demand for one less channel than before the assignment. If another need factor is used, then a correspondingly proportionate reduction is made. A query task 78 is performed after task 76. Query task 78 determines whether the pointer indexes the last cell in need vector 60 (see FIG. 8). (In addition, referring back to FIG. 4, unless task 68 determines that the indexed cell 18 has a positive need and is available, query task 78 is performed, as indicated through connector "B".) If task 78 determines that the pointer does not index the last cell in need vector 60, a task 80 advances the need vector pointer. Task 80 causes the pointer to index a cell 18 having the next highest need due to the ranking of cells 18 in need vector 60. After task 80, program control loops back, as indicated through connector "C", to task 66 (see FIG. 4) to evaluate this next indexed cell 18.

If query task 78 determines that the pointer indexes the last cell in need vector 60 (see FIG. 8), a task 82 is performed. In addition, query task 78 may route program control to task 82 when the need factor from need vector 60 for the cell 18 being evaluated is less than a predetermined value. The predetermined value is set at or below zero. Due to the ranking of cells 18 in need vector 60, execution time may be saved by exiting task 78 when additional assignments can only over-assign the selected channel 22 to cells whose demand has already been met by prior assignments.

Task 82 adjusts need vector 60 (see FIG. 8) to correct the ranking. As discussed above in connection with task 76, a cell's need factor is reduced to reflect assignments of the selected channel 22 to various indexed cells 18. These reductions in need factors may cause need vector 60 to become unordered or mis-ranked. Task 82 adjusts need vector 60 to correct the ranking. Generally, need vector 60 is nearly in its correct ranked order when task 82 begins. The same sort routine which was performed above in task 58 (see FIG. 4) need not be repeated in task 82 because it was observed that the assignment of any cell to a channel does not significantly change the cell's position in the sort order. This approach can be used to develop very efficient code for adjustments to the sort order. In general, the adjustment performed by task 82 may be completed much faster than the initial ranking performed above in task 58.

Alternatively, task 82 may occur after task 76 but prior to connector "B". In which case, query task 84 follows task 76.

After task 82, a query task 84 determines whether the last channel 22 has been processed. Unless the last channel has been processed, additional assignments may be made for additional channels, and program control loops back to the top of the outer loop at task 62 (see FIG. 4), as indicated by connector "D". When task 84 determines that the last channel has been processed, program control proceeds to a query task 86. Query task 86 determines whether the need factor for the top entry in need vector 60 (see FIG. 8) indicates a satisfied demand. In other words, the cell 18 having the highest need for the assignment of channels 22 is evaluated to see if it needs additional channels. If no additional channels are needed, then program control exits on-line process 42. In addition, the investigation of the top entry in need vector 60 may be incorporated in task 84 to exit the outer loop and on-line process 42 whenever all cells' demands have been met, regardless of whether additional channels 22 may be available for assignments.

However, when task 86 of on-line process 42 determines that the demand of the cell 18 having the greatest need for channel assignments has not yet been satisfied after the last channel has been processed, on-line process 42 has been unable to allocate channels 22 in a manner that satisfies demand. A task 88 may then adjust the constraint table level so that on-line process 42 may be repeated using constraints that permit a little greater risk of interference. In addition, or as an alternative, task 88 may restrict any over-assignments of channels 22 to cells 18 which may have been permitted through the operation of tasks 52 (see FIG. 4), 68 (see FIG. 4) and 78. After task 88, program control then repeats on-line process 42 to again assign channels 22 to cells 18 for the subject frame.

When program control exits on-line process 42 a channel-to-cell definition for a frame has been constructed. Assignment matrix 46 (see FIG. 5) contains this definition. Assignment matrix 46 may be saved, and processes 24 (see FIG. 2) and 42 repeated for additional frames. When definitions for a sufficient number of frames have been constructed, definition information for the cells 18 of the various satellites 12 (see FIG. 1) may be obtained from the matrices 46 for the various frames and distributed to the satellites 12. The satellites 12 then conduct communications in accordance with the definitions.

In summary, the present invention provides an improved cellular communication system and method of operating a cellular communication system. Associations between channels and cells are made in response to the demand for communication services in the cells. These associations are rapidly defined. The rapid execution results, at least in part, from actually assigning multiple cells to one channel at a time, rather than vice-versa, so that various assignments of cells to channels allow the same, or common, cells to be assigned to different channels. In addition, the cells are assigned to a channel in order of decreasing cell need. The capacity for communication services provided by a given spectrum is improved because channel-to-cell assignments may be individually crafted to meet the cells' demands.

The present invention has been described above with reference to preferred embodiments. However, those skilled in the art will recognize that changes and modifications may be made in these preferred embodiments without departing from the scope of the present invention. For example, alternate process structures may accomplish substantially the same functions as are described herein. Memory structures other than those depicted herein may by employed. Moreover, while the preferred embodiments described herein relate to a particular orbital geometry and channel parameters, those skilled in the art will appreciate that the present invention may be applied to different geometries and channel parameters, such as those employed with conventional terrestrial cellular systems. These and other changes and modifications which are obvious to those skilled in the art are intended to be included within the scope of the present invention.

What is claimed is:

1. A method of operating a cellular communication system which uses communication channels, said method comprising the steps of:

a) ranking cells of said cellular system in accordance with each cell's need for channel assignments thereby forming a ranked list of cells;

b) selecting one of said channels;

c) assigning said selected channel to a plurality of cells and adjusting said ranked list of cells in response to said channel assignments of each selected channel; and d) repeating said steps b) and c) for other ones of said channels.

2. A method as claimed in claim 1 wherein said step a) comprises the step of identifying a demand for channels in each of said cells.

3. A method as claimed in claim 2 wherein said step d) repeats until said demand is satisfied by said step c).

4. A method as claimed in claim 2 wherein said step a) additionally comprises the step of assigning a need factor to each of said cells, said need factor being determined in response to said demand.

5. A method as claimed in claim 1 wherein said step c) comprises the step of identifying cells to which said selected channel is constrained from being assigned in response to each assignment of a channel to a cell.

6. A method as claimed in claim 5 wherein:

said method additionally comprises the step of forming a memory structure which associates availability indications with channel identities and with cell identities; and said step c) comprises, in response to each assignment of said selected channel to a cell, the step of associating a not-available indication in said memory structure with said selected channel and others of said cells that are within a reuse distance of said selected cell.

7. A method as claimed in claim 1 additionally comprising the step of ranking said channels so that said steps b), c), and d) assign higher ranked channels to cells more often than lower ranked channels.

8. A method as claimed in claim 1 wherein:
said steps b), c), and d) form a channel-to-cell definition; and
said method additionally comprises the step of conducting communications in accordance with said channel-to-cell definition.

9. A method as claimed in claim 8 additionally comprising the step of operating a satellite to project cellular antenna patterns through which said communications in accordance with said channel-to-cell definition are conducted.

10. A method of operating a cellular communication system which uses communication channels, said method comprising the steps of:
a) ranking a plurality of spaced apart cells in accordance with each cell's need for channel assignments thereby forming a ranked list of cells;
b) selecting one of said channels and adjusting said list of cells in response to assignments of each selected channel;
c) assigning said selected channel to said plurality of spaced apart cells, said assigning step forming one portion of a channel-to-cell definition; and
d) repeating said steps b) and c) for other ones of said channels to form other portions of said channel-to-cell definition and so that said pluralities of cells in repetitions of said step b) include at least one common cell.

11. A method as claimed in claim 10 additionally comprising the step of identifying a demand for channels in each of said cells.

12. A method as claimed in claim 11 wherein said step d) repeats until said demand is satisfied by said assignments of said step c).

13. A method as claimed in claim 12 wherein said step c) comprises the step of preventing the assignment of said selected channel to cells whose demand has been satisfied by prior assignments.

14. A method as claimed in claim 10 wherein said step c) assigns said selected channel to said plurality of cells in an order determined in response to said ranking step.

15. A method as claimed in claim 10 wherein said ranking step comprises the steps of:
identifying a demand for channels in each of said cells; and
assigning a need factor to each of said cells, said need factor being determined in response to said demand.

16. A method as claimed in claim 10 wherein said step c) comprises, in response to each assignment of a channel to a cell, the step of identifying cells to which said selected channel is constrained from being assigned.

17. A method as claimed in claim 16 wherein:
said method additionally comprises the step of forming a memory structure which associates availability indications with channel identities and with cell identities; and said step b) comprises, in response to each assignment of said selected channel to a cell, the step of associating a not-available indication in said memory structure with said selected channel and others of said cells that are within a first reuse distance of said selected cell.

18. A method as claimed in claim 17 wherein said assigning step comprises the steps of:
identifying a cell; and
evaluating said memory structure to determine whether a non-available indication has been associated with said selected channel and said identified cell.

19. A method as claimed in claim 17 wherein said step b) additionally comprises, in response to each assignment of said selected channel to a cell, the step of associating a not-available indication in said memory structure with others of said channels and others of said cells that are within a second reuse distance of said selected cell.

20. A method as claimed in claim 19 wherein said others of said channels are adjacent to said selected channel.

21. A method for assigning a communications channel to a plurality of cells of a cellular communications system, the method comprising the steps of:
determining communication demand requirements in the plurality of cells;
defining a minimum reuse distance for the communications channel between cells of the plurality of cells;
determining frequency and time slot differential constraints;
ranking the plurality of cells according to communication demand requirements;
assigning the communications channel to a first ranked cell of the plurality of cells according to the communication demand requirements; and
assigning the communications channel to other ranked cells of the plurality of cells according to the communication demand requirements such that the communications channel is not available in cells within the minimum reuse distance of the first ranked cell or the other ranked cells or in violation of the frequency and time slot differential constraints.

22. A method as claimed in claim 21, comprising the step of repeating the steps of assigning the communications channel to a first cell and assigning the communications channel to other cells for additional communications channels until the communication demand requirements are satisfied.

23. The method of claim 21, wherein the step of determining communication demand requirements comprises the step of ranking the plurality of cells in decreasing order of communications channel demand and free communications channel availability.

24. The method of claim 22, wherein the step of repeating the steps comprises the step of assigning the additional communications channels in decreasing order of frequency.

25. The method of claim 23, further comprising the step of revising the ranking after the step of assigning the communications channel to other cells.

* * * * *